United States Patent [19]
Casselman

[11] 3,746,017
[45] July 17, 1973

[54] DENTAL FLOSS HOLDER AND APPLICATOR

[76] Inventor: James S. Casselman, 8232 East Coolidge St., Scottsdale, Ark. 85251

[22] Filed: Feb. 14, 1972

[21] Appl. No.: 226,010

[52] U.S. Cl............................................. 132/92 A
[51] Int. Cl............................................. A61c 15/00
[58] Field of Search ................... 132/89, 92, 91, 90; 32/40

[56] References Cited
UNITED STATES PATENTS 2,450,635  10/1948  Dembenski ..................... 132/92 A
1,700,551  1/1959   Stafford ......................... 132/92 A Primary Examiner—Robert Peshock
Attorney—Warren F. B. Lindsley

[57] ABSTRACT

A dental floss holder and applicator having a floss storage and dispensing reel and a floss take-up reel and an arcuate arm to hold floss in application position.

10 Claims, 6 Drawing Figures

PATENTED JUL 17 1973
3,746,017
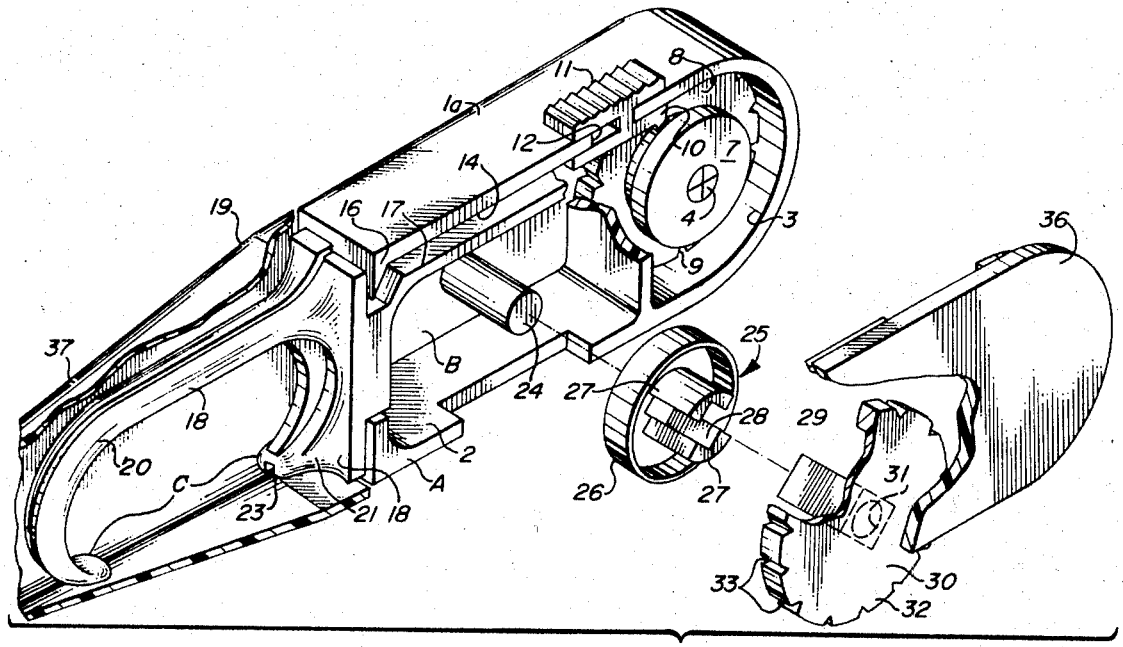
FIG.-1
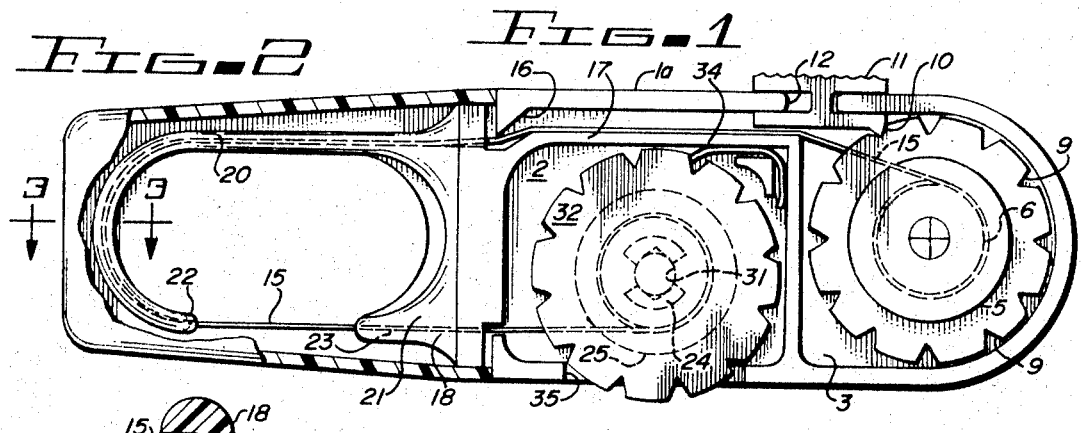
FIG.-2
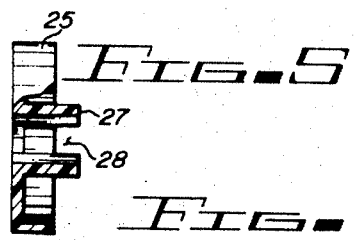
FIG.-3
FIG.-4
FIG.-5
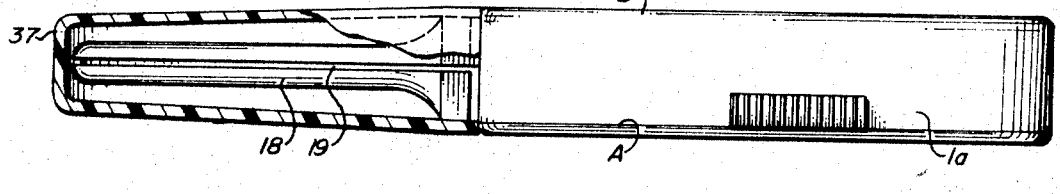
FIG.-6

DENTAL FLOSS HOLDER AND APPLICATOR

BACKGROUND OF THE INVENTION

This invention relates to a dental floss holder and applicator which will permit the cleaning of teeth without fingers being inserted into the mouth, and which provides a sanitary storage and dispensing means carried by the dispenser for both the new or unused floss as well as the used floss.

FIELD OF THE INVENTION

This invention is particularly directed to a dental floss dispenser and applicator which carries a new floss dispensing reel and used floss take-up reel in the handle thereof and has an arcuately shaped floss positioning and holding member extending therefrom to permit use of the floss in the mouth without the user's fingers entering the mouth.

DESCRIPTION OF THE PRIOR ART

It is well known that many attempts have been made to make a convenient dispenser and/or applicator for dental floss, however, none of these has gained wide acceptance. The prior art devices have not been entirely sanitary, have been inconvenient and awkward to use and have not provided means to maintain proper tension on the floss. None of these devices have provided a sanitary and convenient means to renew the floss in the area of use while providing a sanitary and convenient means for storing and disposing of used floss.

SUMMARY OF THE INVENTION

In accordance with the invention claimed, a dental floss dispenser and applicator is provided for overcoming the shortcomings, disadvantages and inconveniences of the prior art devices of this type and to provide in a single unit a dispenser and applicator for dental use which is sanitary, convenient to use, and easy to operate.

Most of the harmful bacteria within the mouth live in the tiny crevices near the gum line between the teeth and the gums. These bacteria clumped together in tiny colonies or clusters are capable of producing harmful effects such as tooth decay, tender and bleeding gums, foul breath etc. The presence of bacteria alone in a disorganized state produces no harmful effects. To disorganize the bacteria daily will eliminate if not greatly reduce dental disease. This can be accomplished by the proper use of dental floss.

It is therefore, one of the principal objects of this invention to provide a new and improved compact dental floss dispenser and applicator for use in disorganizing bacteria in the mouth around the tooth gum line which has a new floss storage and dispenser reel and a used floss take-up storage reel contained in the handle thereof, and a suitable floss holder extending from the handle which carries and supports the dental floss in applicating position.

Another object is to provide such a device wherein the new floss reel and the used floss reel are separated from each other for sanitary purposes.

A further object is to provide separate channels through which the dental floss travels on its way from the new floss reel to the applicator area and to the used floss reel so that there is no direct communication of the channels to eliminate the possibility of contamination of the new floss before it gets to the applicator or used area.

A still further object is to provide a floss take-up reel which has a notched edge and a spring biased ratchet engaging the notches to permit suitable tension to be maintained on the dental floss for proper use thereof.

A still further object is to provide a new floss storage reel which has a notched rim or edge, and a hand operated ratchet which permits the selective rotation or stopping of the new floss reel.

A still further object is to provide such a device wherein the new floss reel is completely enclosed in the handle of the device during use, and wherein the take-up reel has one rim or edge thereof exposed in the handle of the device for rotation purposes to wind used floss onto the take-up reel, to provide tension to the floss and simultaneously to unwind floss from the new floss storage reel when the manual stop is released.

A still further object is to provide a dental floss dispenser and applicator with a sanitary cap or cover for storage and carrying purposes.

A still further object is to provide such a device which is simple in construction and operation, and wherein the changing of reels when the floss is used is simple to accomplish.

Yet another object of this invention is to provide such a device which may be made with simple molded plastic parts so as to inexpensively manufacture and assemble the device thereby being able to sell it at a price which is within the reach of the general public.

A still further object is to provide such a device that will be accepted by the general public and thereby bring the use of dental floss into more common use so that the public will benefit form the use of dental floss to prevent cavities in teeth due to plaque being on the teeth near the gum lines and food particles being lodged between teeth.

These and other objects and advantages of this invention will become more apparent as the description proceeds, and the features of novelty which characterize this invention will be pointed out with particularity in the claims annexed to and forming part of this specification.

BRIEF DESCRIPTION OF THE DRAWINGS

The present invention may be more readily described by reference to the accompanying drawing in which:

FIG. 1 is an exploded fragmental perspective view of a dental floss dispenser and applicator made in accordance with my invention;

FIG. 2 is a side elevational view of FIG. 1 with the side cover removed and the sanitary protective cap broken away to shown the parts of the device in their operative relationship;

FIG. 3 is a sectional view on the line 3 — 3 of FIG. 2;

FIG. 4 is a fragmental view similar to FIG. 2 with the take-up reel removed;

FIG. 5 is a fragmental sectional view of the portion of the take-up reel on which the used floss is wound; and FIG. 6 is a top view of FIG. 2 with parts of the sanitary cap broken away to show the dental floss guide channel in the C-shaped floss holding extension.

DESCRIPTION OF THE PREFERRED EMBODIMENT

Referring more particularly to the drawing by characters of reference FIG. 1 discloses a dental floss dispenser and applicating device 1 having a body portion or handle 1a. Handle 1a defines a cavity having an open side A and a closed side B. Handle 1a is formed to provide two nonconnected reel chambers 2 and 3 molded thereinto which are separate and isolated from each other with no communicating openings therebetween for sanitary purposes. Chamber 3 is the new floss reel chamber and chamber 2 is the used floss take-up reel chamber, as will become apparent.

Chamber 3 has a reel shaft 4 extending laterally of side B and fixedly attached thereto or preferably molded integrally therewith to rotably carry a new floss dispensing reel 5. Reel 5 has a central spool portion 6 on which floss is wound and a pair of spaced flanges 7 and 8 to contain the floss on the spool. Flange 8 is provided with a series of notches 9 — 9 in its periphery as shown, to permit the manually operable lock and release cog 10 to be inserted into or released from the notches 9 — 9 to lock the reel against rotation or to permit the rotation of the reel to dispense floss. Cog 10 is a part of an opeating lever or slide 11 which is slidably carried in a slot 12 in handle 1a and has a finger operated corrigated operating button 13 extending through slot 12 to permit the engagement or disengagement of the cog 10 from outside the handle 1a. Thus, the control of reel 5 is obtained by the operation of the slide or lever 11 to either permit or prevent the unreeling of floss from reel 5.

Handle 1a has a suitable floss passage slot or groove 14 therein, communicating with chamber 3 but not with chamber 2, to permit dental floss 15, shown in FIGS. 1 and 2 carried on reel 5 to be extended from reel 5 outside of the handle 1a of the dispenser and applicator 1. As may be readily noted the groove or slot 14 extends along the upper face of handle 1a. The outer face of upper wall 17 defining chamber 2 in conjunction with the location of reel 5 and lug 16 depending of handle 1a provides a frictional braking and guiding surface for the floss, as it is pulled from reel 5, to minimize the possibility of excessive unwinding of floss during operation of the dispensing and application.

A substantially C-shaped floss holding arm 18 extends from the inner end of handle 1a, as shown in FIGS. 1 and 2 is preferably molded integral with handle 1a. Arm 18 has a peripheral groove 19 extending from its connection to handle 1a to the outer end of the arm to guide and hold floss 15 at all times. Groove 19 is in communication with the floss passage slot or groove 14 in handle 1a and preferably is in alignment with the lower edge of lug 16.

The substantially C-shaped arm 18 is connected to and extends outwardly from the inner end of handle 1a with the major portion 20 of the C-shaped arm extending from the upper portion of the handle. The minor portion 21 of the C-shaped arm extends from the lower portion of the handle and is in alignment with the outer end 22 of the major portion of the arm. The minor portion 21 of arm 18 also has a groove 23 therein to receive and guide the floss 15 at all times. The guide groove 23 communicates with the chamber 2 in handle 1a.

The chamber 2 has a shaft 24 therein arranged to extend laterally of side B to rotatively carry a floss take-up spool 25. The take-up spool is preferably molded in two pieces, a minor spool portion including an inner flange 26 and a spool section 27 — 27 which has an angular axial opening 28 therein to receive the similarly angular axial shaft 29 on a major portion 30 of the spool 25. These two parts when assembled will rotate together on the shaft 24, the axial round opening 31 in the rectangular shaft 29 serving to provide a rotatable mounting for the take-up spool 25.

The major portion 30 of the take-up spool 25 has a large flange 32 which is provided with notches 33 — 33 substantially equally spaced around its periphery, similar to the notches 9 — 9 in the floss reel 5, as shown. A suitable spring 34 is carried in the chamber 2 to engage the notches 33 — 33 as the spool 25 is rotated to act as a ratchet and prevent the rotation of the spool in one direction but permitting rotation of the spool in the opposite direction.

As clearly shown in FIG. 2 the large flange 32 extends slightly outwardly of the body or handle 1a, on the lower edge thereof, through a slot 35 in the handle, to permit the rotation of the take-up reel as required during the use of the device when the cover member 36 is in place on the handle. Cover member 36 encloses all of the parts within the body except the slide 11 and a portion of the reel or spool 25.

A removable cap 37 is provided to slip over the floss carying arm 18 to protect it from contamination or damage during its periods of non use, making it completely sanitary to carry, store or pack while traveling.

OPERATION

To load the dispersing and applicating device, cover member 36 is removed from handle 1a and a spool 5 containing new dental floss is mounted on shaft 4 in chamber 3, and lug 10 is disengaged from notches 9 to permit the spool to be rotated. A length of floss is pulled from the reel and guided into slot 14 in the upper edge of handle 1a, around lug 16 and along groove 19 in the major portion 20 of the C-shaped arm 18. It is then carried across the open face C of the C-shaped arm and into slot 23. From there it is brought into chamber 2 and the end of the floss is wrapped around the spool portions 27 of spool 25. Spool 25 is mounted on shaft or axle 24 for rotation thereon.

Cover member 36 is then snapped in place on handle 1a to close the cavity of the handle against contamination and to hold the moving parts of the device in place.

Spool 25 is then rotated to wind up any preferred length of dental floss to insure a sanitary untouched section of floss across the open area C, of arm 18. The slide 11 is then moved to engage cog 10 in one of the notches 9 and the spool 25 then may be ratcheted or rotated until suitable tension is applied to the floss across open area C for proper use in flossing and cleaning the user's teeth. Spring ratchet 34 will maintain the tension of the floss until slide 11 and lug 10 are moved to permit spool 5 to rotate with the floss 15. It can readily be seen that one may conveniently manipulate the floss to any desired area of the mouth to use the floss 15 to clean between and around the gum line of the teeth. The floss across the opening C may be easily renewed by the operation above described, and a perfectly sanitary condition is maintained at all times since there is no communication from the used floss spool chamber 2 to the new floss spool chamber 3.

It should be recognized that floss dispensing and take-up spools 5 and 25, respectively, may be identical and are shown as such in the drawings so that spool 5 when empty may be used as the take-up spool 25. Further, since the spools 5 and 25 have parts that are slidably engageable, the used floss may be removed readily from the take-up spool by merely taking it apart and sliding the used floss off of spool portion 27.

It is deemed apparent from the above that I have provided an improved sanitary and convenient dental floss dispenser and applicator which may be manufactured with simple processes and which is simple and convenient to use and store. It will be apparent to those skilled in the art that changes and other modifications may be made to the apparatus shown and described herein without departing from the spirit of the invention or from the scope of the appended claims.

What I claim is:

1. A dental floss dispenser and applicator comprising:
a hollow elongated handle,
a substantially C-shaped arm extending from and integral with said handle and having a groove for guiding floss in its periphery,
a spool for unused floss rotatably mounted in said handle, and
a spool for used floss rotatably mounted in said handle and having a portion thereof exposed outside said handle to permit rotation thereof from externally of said handle,
said handle having openings therein to permit dental floss to extend from said spool for unused floss in said groove around said arm and across the open area of said arm to said spool for used floss for winding thereon.

2. The dental floss dispenser and applicator set forth in claim 1 in further combination with a cog means mounted within said handle for engaging with and locking and releasing said spool for unused floss.

3. The dental floss dispenser and applicator set forth in claim 2 wherein said cog means comprises a manually operable slide extending outwardly from said handle for selectively engaging with said spool for unused floss.

4. The denlal floss dispenser and applicator set forth in claim 2 in further combination with spring means mounted within said handle for engaging said spool for used floss to permit its rotation in one direction only.

5. A dental floss dispenser and applicator comprising:
a hollow elongated handle,
said handle defining two cavities isolated from each other,
a floss dispensing spool rotatably mounted in one of said cavities,
a floss take-up spool mounted in the other of said cavities,
a substantially C-shaped arm integral with and extending outwardly of said handle,
said arm being provided with a groove in its periphery for providing a track for the passage of dental floss,
said handle defining a first passageway for floss from said one of said cavities to one end of said groove in said arm and a second passageway from the open end of said arm to said other of said cavities,
means extending through said handle and into said one of said cavities for controlling said floss dispensing spool and an aperture in said handle extending into said other of said cavities for exposing said floss take-up spool for predetermined movement thereof.

6. The dental floss dispenser and applicator set forth in claim 5 wherein:
said floss dispersing spool is provided with teeth around its periphery, and
a ratchet slidably mounted on said handle for selectively engaging with said teeth in said floss dispensing spool for controlling the dispensing of floss.

7. The dental floss dispenser and applicator set forth in claim 6 in further combination with a detachably mounted first cover for forming one side of said handle and for covering both of said cavities, and
a detachably mounted second cover for fitting over said C-shaped arm to cover it when the dental floss dispenser and applicator is not in use.

8. The dental floss dispenser and applicator set forth in claim 7 in further combination with spring means mounted within said other of said cavities for biasing said take-up spool in a floss winding direction.

9. The dental floss dispenser and applicator set forth in claim 6 wherein said floss dispensing spool and said floss take-up spool are identical so that said floss dispensing spool may be used as said floss take-up spool when it is empty.

10. The dental floss dispenser and applicator set forth in claim 9 in further combination with spring means mounted within said other of said cavities for engaging teeth in said floss take-up spool to bias said floss take-up spool in a floss winding direction.

* * * * *